United States Patent [19]

Ohtsu et al.

[11] 3,824,838

[45] July 23, 1974

[54] PROCESS GAS CHROMATOGRAPHIC APPARATUS

[75] Inventors: Takawo Ohtsu, Yokohama; Yukinobu Nakamura, Tokyo; Fujihiko Sekido, Yokohama, all of Japan

[73] Assignee: Japan Gasoline Co., Ltd., Tokyo, Japan

[22] Filed: Apr. 7, 1972

[21] Appl. No.: 242,126

Related U.S. Application Data

[63] Continuation-in-part of Ser. No. 75,279, Sept. 24, 1970, abandoned, which is a continuation of Ser. No. 733,046, May 29, 1968, abandoned.

[30] Foreign Application Priority Data

May 31, 1967 Japan.............................. 42-34124

[52] U.S. Cl. ................................................ 73/23.1
[51] Int. Cl. ......................................... G01n 31/08
[58] Field of Search............. 73/23.1, 19; 23/232 C, 23/232 E, 254 E, 255 E

[56] References Cited
UNITED STATES PATENTS

3,127,762  4/1964  Kneen et al............................. 73/23
3,177,138  4/1965  Larrison........................... 73/23.1 X
3,281,687  10/1966  Boer et al........................ 73/23.1 X
3,405,549  10/1968  Finley................................... 73/23.1

*Primary Examiner*—Richard C. Queisser
*Assistant Examiner*—Stephen A. Kreitman
*Attorney, Agent, or Firm*—Woodhams, Blanchard and Flynn

[57] ABSTRACT

A control system in a process gas chromatographic apparatus for analyzing a stream sample from a chemical process plant, comprises a peak senser means for sensing a detector signal, a programming timer means providing a signal corresponding to the retention time of only the component to be determined in the sample to the control system, and a control circuit actuating an integrater-recorder and sensitivity-variable means, whereby the concentration of said component in the sample is automatically and continuously obtained in digital value as a proportion to the total amount of the whole of the components contained in the sample.

11 Claims, 7 Drawing Figures

ATTENUATOR SELECTOR

Fig. 6

RELATION BETWEEN THE SIGNAL CONDITION FROM PEAK SENSOR
AND PROGRAMMING TIMER AND THE FUNCTION OF CONTROL CIRCUIT

| CASE | (a) COMPLETE COINCIDENCE | (b) P.T. INCLUDED IN P.S. | (c) P.S. INCLUDED IN P.T. | (d) NO P.T. SIGNAL | (e) NO P.S. SIGNAL | (f) PARTIAL-COINCIDENCE (1) | (g) PARTIAL-COINCIDENCE (2) |
|---|---|---|---|---|---|---|---|
| SIGNAL FROM PEAK SENSOR | | | | | | | |
| SIGNAL FROM PROG. TIMER | | | | | | | |
| ACTION TIME OF Ry 1 | | | | | | | |
| ACTION TIME OF Ry 5 | | | | | | | |
| ACTION TIME OF Ry 6 | | | | | | | |
| FUNCTION OF CONTROL CIRCUIT | | | | | | | |
| PRINTOUT | * | * | * | * | * | * | * |
| RESET | * | * | * | | * | * | * |
| SELECTOR SWITCH | | | | | | | |

Fig. 7

PROCESS GAS CHROMATOGRAPHIC APPARATUS

CROSS-REFERENCE TO RELATED APPLICATIONS

The present application is a continuation-in-part of application Ser. No. 75,279, filed Sept. 24, 1970, which in turn is a continuation of application Ser. No. 733,046, filed May 29, 1968, now both abandoned.

FIELD OF THE INVENTION

The present invention relates to a control system in a process gas chromatographic apparatus for analyzing a sample of a stream in a chemical process plant, whereby the concentration of only the component to be determined in the sample is automatically and continuously obtained in digital value as a proportion to the total amount of the whole of the components contained in the sample.

BACKGROUND OF THE INVENTION

Heretofore, it has been well known that conventional process gas chromatographic apparatuses employ an integration-method data processing system to obtain accurate measurement of the concentration of the components in a sample. The apparatus described in the patent of H. Boer, et al., U.S. Pat. No. 3 281 687, is one such apparatus and employs an integration means giving the integrated value of the D.C. voltage generated in an analyzer detector, as a mechanical displacement on a relevant potentiometer.

In the apparatus according to Boer's invention, however, in spite of employing an integration method for calculation of the concentration of the component, the result obtained by it may not always be accurate, because the apparatus is not equipped for checking whether the results obtained correspond to only the relevant components whose concentration is to be measured.

BRIEF DESCRIPTION OF THE DRAWINGS

The present invention is explained by the accompanying drawings, wherein.

DETAILED DESCRIPTION

Figure 1:
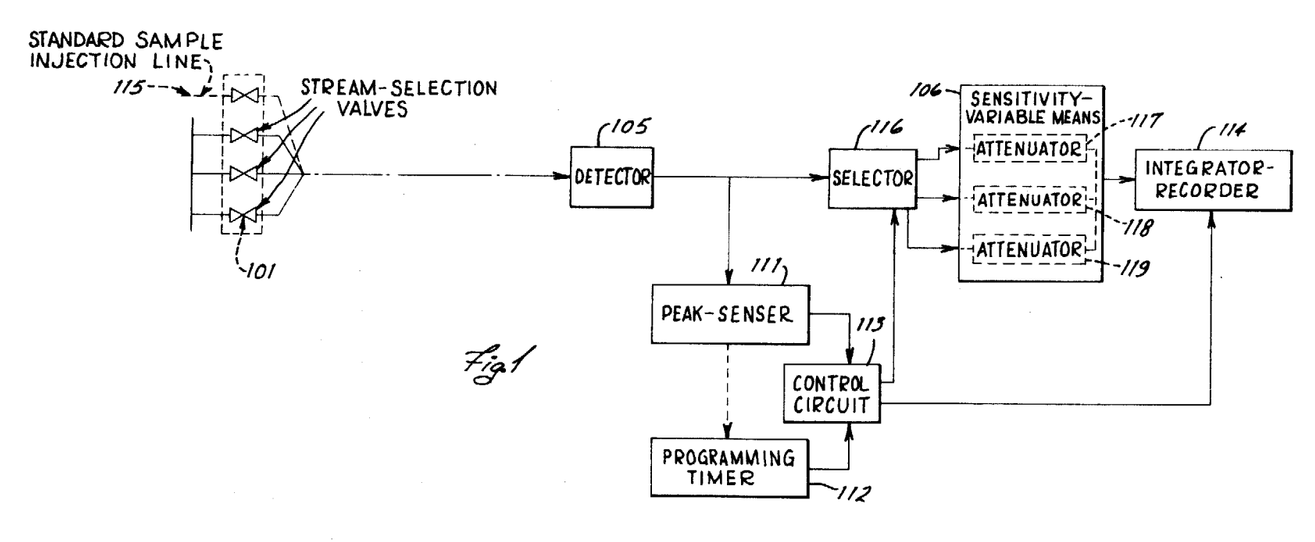
FIG. 1 is a conceptual block diagram of a process gas chromatographic apparatus with the control system according to the present invention.

FIG. 1 illustrates a process gas chromatographic apparatus including the control system of the present invention. For the sake of simplicity, the usual sample conditioning system, analyzer system and the like are indicated only schematically, by a chain line (except for the detector 105), because these components are conventionally provided in a process gas chromatographic apparatus and in any event shown in the embodiment of FIG. 3.

The sampling system principally comprises a group of stream-selection valves for selecting the stream to be analyzed in a chemical process unit and a sample conditioner for controlling temperature, pressure, flow rate, etc., of the sample to be analyzed. The analyzer system principally comprises a sample injection valve for injecting a constant volume of the sample, a partition column for partitioning the injected sample into its individual components, and the detector 105 for detecting the individual components as separated in the partition column.

In FIG. 1, the detector out-put signal, with peaks generated in the detector 105 of the analyzer system, is supplied to a sensitivity-variable means 106, which may comprise a plurality of adjustable attenuators or amplifiers 117, 118 and 119 and which in turn feeds an integrator-recorder 114. In the sensitivity-variable means 106, the detector out-put signal is adjusted so that the concentration of a component is given by the integrator-recorder 114 as a digital value which represents the percentage, or the proportion, of the amount of the component to be measured in relation to the total amount of whole components to be determined, that is, whole components contained in the sample.

The control system of the present invention comprises three elements, i.e., a peak senser 111, programming timer 112 and control circuit 113.

A detector out-put signal with peaks is also supplied to the peak senser 111 which senses the presence of all of the peaks generated in the detector. When the peak senser senses the presence of the peaks in the detector signal, it communicates the presence of the peaks to control circuit 113. On the other hand, programming timer 112 sends to control circuit 113 an electrical signal corresponding to the retention time of only the component the concentration of which is to be determined. The programming timer 112 is previously programmed by utilizing the peak senser signal to the control circuit 113 corresponding to the retention time of only the component to be determined. The details of the method for programming will be explained hereinafter.

Control circuit 113 has two functions. One is to indicate to an integrator-recorder 114 whether to pick up or discard the calculated results of the detector signal passed through the sensitivity-variable means 106. Another function is to switch a selector 116 so that a given detector signal is directed to the relevant part of the sensitivity-variable means 106.

As the peak senser, it is possible to employ either level slicer type means sensing detector out-puts having an electrical value higher than a certain level, or differential type means sensing the start and the end of a peak.

In the present invention, programming of the programming timer is carried out by introducing a standard sample to the apparatus, through a stream selection valve 101, which standard sample includes the same components for which the concentration is to be determined. The detector out-put signal generated in response to the standard sample is supplied to peak senser 111. The peak senser 111, in turn, communicates the presence of the peaks of said components to be determined to the programming timer 112, where the time position, that is, the retention time, of each such component is memorized. While any kind of means having a memory function may be employed as the programming timer means, magnetic memory type means such as a magnetic tape or disc are convenient.

As the integrator-recorder, it is preferable to use for accurate calculation an electric calculating device, for example voltage-to-frequency converter which may convert a D.C. voltage varying with time into an electric frequency proportional to the voltage amplitude value of the D.C. voltage and then count the electric frequency generated thereby, i.e., count the pulses in the variable frequency signal over the time duration of the D.C. voltage peak. Next, the signals from both the peak senser 111 and the programming timer 112 are supplied to the control circuit 113 which controls the selector 116 for the sensitivity-variable means 106 and, if necessary, decides whether or not to pick up the signal passed through the sensitivity-variable means to the integrator-recorder 114.

In the process gas chromatographic apparatus of the present invention, including the control system as discussed above, the deficiency of low accuracy found in prior apparatuses is remarkably decreased. For example, in the apparatus of Boer's invention, it is considered that the clutch is constituted so that it covers substantially all of the time span where the peak signal of the relevant component is predicted to be present, with a necessary allowance in front of and behind the peak, by means of the instruction from the programming timer. Therefore, in case there are signals originating with noise, e.g., a contaminant adjacent to the component for which concentration is to be determined, or the like, the apparatus disclosed by Boer is unable to identify these signals. As a result, these signals may be mixed to give error in the final calculated result.

Figure 2:
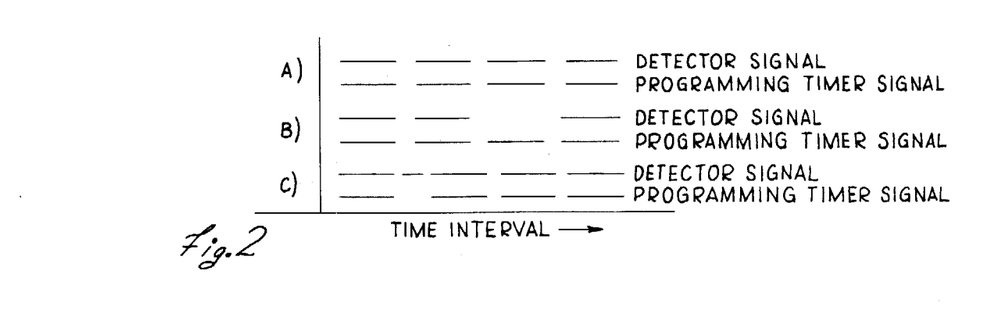
FIG. 2 diagrammatically illustrates one of the functions of the control system of the apparatus illustrated in FIG. 1.

The function of the control circuit 113 of the control system of the apparatus of the present invention will be clearly understood by concrete explanation according to the illustration of FIG. 2. In FIG. 2, when the time position of the signal from the detector and peak senser is entirely in accordance with the signal from the programming timer as shown at A, then the said control circuit 113 causes the selector 116 to direct the individual detector signal to the relevant attenuator in the sensitivity-variable means 106, as well as causes the signal passed through the relevant attenuator to be calculated, and recorded by integrator-recorder 114.

Secondly, as shown at B in FIG. 2, in the case where the signal from the peak senser 111 is absent and the signal from the programming timer 212 is present (i.e., this signifies that the concentration of the component to be determined is zero or near zero), then the control circuit 113 causes the detector signal to be supplied to the relevant attenuator within the sensitivity-variable means 106 and the calculated data obtained in the integrator-recorder is recorded as a zero digital value.

Thirdly, as shown at C, in case the signal from the peak senser 111 is present and the signal from the programming timer 112 is not present (i.e., this signifies that such peak senser signal does not correspond to the component to be determined, but is noise or the like), then the data obtained in the integrator-recorder is not recorded by means of the instruction from the control circuit 113.

Any pattern of electric signal may be employed as the signals for the peak senser and the programming timer, but it is not preferable to employ instant pulse signals for both signals to the control circuit.

The procedure for preparation of the sensitivity-variable means will now be explained more in detail. First of all, it is necessary to prepare said means before conducting analysis so that the concentration of the individual component is given as a proportion to the total amount of whole of the components in the analyzed sample. As such sensitivity-variable means, attenuators or amplifiers can be employed.

Generally, these are required to be provided by the same number as that of the components of which concentration is determined, and each of them is switched in due order so that the detector signal of a corresponding component is directed to the relevant one of them, such switching being in response to the output of the control circuit. The following explanation will for example be concerned with a case wherein attenuators are employed and, for purposes of illustration, it will be assumed that the sensitivity-variable means 106 includes therein three attenuators designated as 117, 118 and 119 as illustrated by the dotted lines in FIG. 1.

A standard sample, containing therein a known concentration of the component to be determined, is prepared and introduced through the standard sample injection line 115 (FIG. 1) into the process gas chromatographic apparatus in order to prepare and initially adjust the attenuators. The value of the concentration of each component in the standard sample as obtained and read from the apparatus is then compared with the known value of the concentration of the individual components contained in the standard sample. From this comparison, the attenuators can then be adjusted so that the concentration value determined by the apparatus will be the same as the known concentration value of the component in the standard sample.

For example, a standard sample which comprises 10 percent of component A, 30 percent of component B and 60 percent of component C is prepared. The concentration of each component contained in the standard sample is then determined in the apparatus in which the attenuators 117, 118 and 119 are not yet initially adjusted. In this case, let us suppose that the apparatus results in digital values of 5, 60 and 180 corresponding to the concentration of the components A, B and C, respectively.

In comparing the known concentration values with the digital values produced by the apparatus, the required initial adjustment of the attenuators can be determined. In the above example, the degree of attenuation for attenuators 117, 118 and 119 is decreased by one-half for component A, increased 2 times for component B, and increased 3 times for component C, respectively. By the procedure stated above, the initial preparation and/or adjustment of the attenuators is accomplished so as to establish the base operating conditions whereby, in actual operation of the apparatus, the digital value recorded will represent the actual percentage of the desired component relative to the total of all components contained in the sample.

In putting the present invention into practice, a magnetic tape, mechanical timer, etc., can be employed as the programming timer 112 and the signal for informing the presence of the peak to the peak senser may be the signal from the detector or the signal through the attenuator.

OPERATION

Figure 3:
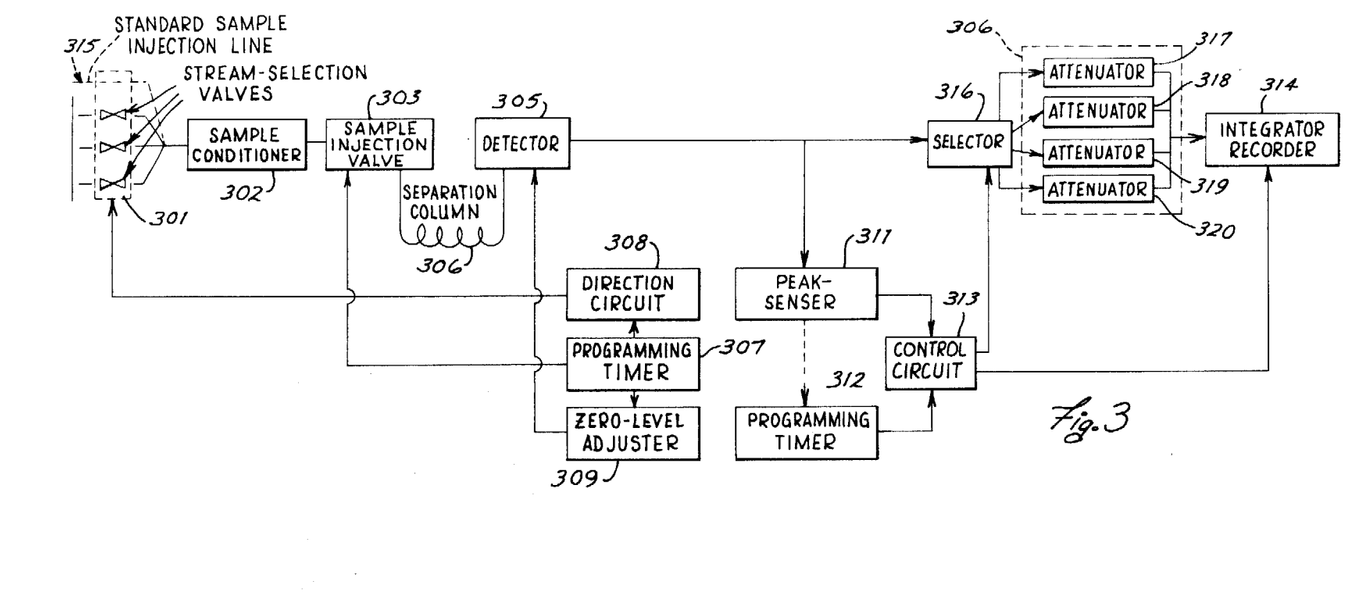
FIG. 3 is a block diagram of a complete apparatus with the control system according to the present invention.

The operation of the apparatus with the control system of the present invention will be evident from the description which follows. FIG. 3 shows a block diagram which represents an apparatus which has actually been used for the analysis of a gas stream containing $H_2$, CO, $CO_2$ and $CH_4$. In the figure, a sample gas stream is introduced from a steam reforming of hydrocarbons through one of the stream-selection valves 301 and is supplied to the sample conditioner 302 for conditioning or controlling pressure, temperature, etc. An amount of the sample from the conditioner which has the same volume as the standard sample employed in calibration is then injected through the sample injection valve 303 into the separating column 304 wherein the injected sample is separated into its individual components. Each component separated in the column is moved to the detector for generating an electric signal with peak. The detector out-put signal with peak is then supplied to the sensitivity-variable means 306, which comprises a plurality of attenuators 317, 318, 319 and 320 which hae previously been adjusted by use of a standard sample introduced through injection line 315, which attenuators are selectively actuated by selector 316. The signal from the attenuator is introduced to the integrator part in integrator-recorder, where the signal is converted to the digital value, and integrated to give the concentration of individual component of the sample in proportion to the total amount of the whole of the components contained in the sample. The result is recorded or read out on the integrator-recorder 314.

A portion of the detector out-put signal is provided to the peak senser 311 for sensing the presence of the detector signal. The signal generated in the peak senser is then provided to the control circuit 313. On the other hand, the information concerning the retention time corresponding to the component to be determined is also provided to the control circuit 313 from the programming timer 312. The control circuit 313, provided with the signals from both the peak senser and the programming timer, thus controls the attenuator selector 316, so that the detector signal is supplied to the corresponding attenuator previously prepared as mentioned above.

There are also preferably provided in this apparatus, another programming timer 307 for controlling the operation of the sample-injection valve and a direction circuit 308 for controlling the operation of the stream-selection valves and a zero-adjuster 309 for adjusting the zero-level of the detector out-put signal. Although two programming timers are employed in this apparatus, it is obvious that one programming timer could be used for performing the function of both programming timers as stated above.

By establishing the initial preparation of the attenuator according to the procedure mentioned above, the process gas chromatographic apparatus can be directly used for the analysis of the sample.

While the apparatus illustrated in FIGS. 1 and 3 has used one or more attenuators for determining the component concentration, same has been described as using attenuators merely for purposes of illustration since the attenuators in the apparatus of the present invention could be replaced by or function as amplifiers if desired.

Figure 4:
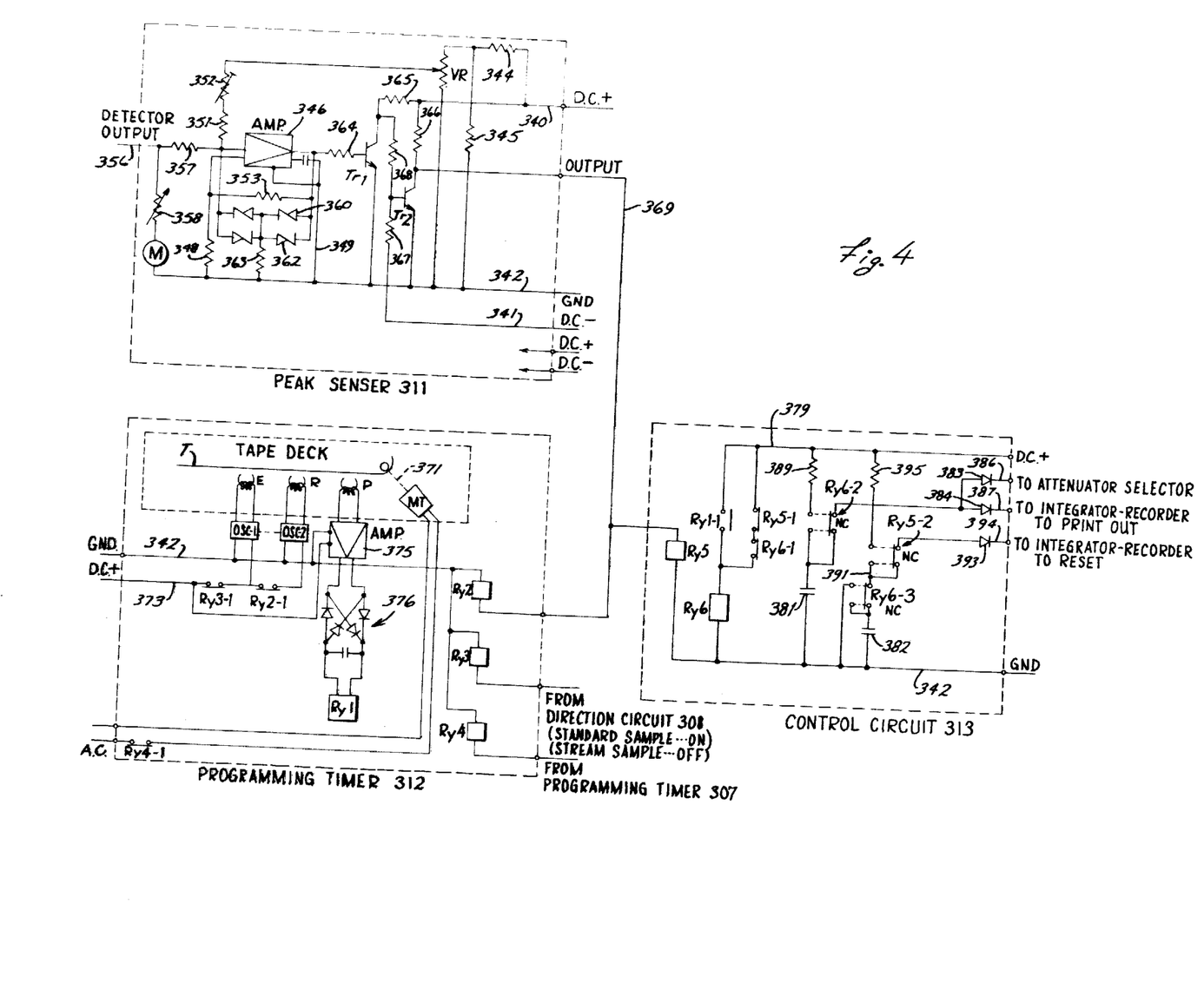
FIG. 4 is a circuit diagram of the peak senser, programming timer and control circuit of the apparatus of FIG. 3.

FIG. 4 discloses in more detail the peak sensor 311, programming timer 312 and control circuit 313 in their preferred form.

More particularly, the peak sensor 311 connects through positive and negative DC supply lines and a ground line 340 through 342, respectively, to a conventional voltage supply not shown. A voltage divider comprising resistors 344 and 345 connects from the positive supply 340 to ground line 342, resistor 345 being paralleled by a variable resistor VR. The peak sensor 311 is of the level slicer type as above-mentioned and incorporates an amplifier 346. Operating potential is supplied the amplifier 346 in any convenient way, e.g., by connections not shown to the positive and negative supply line 340 and 341 and through a resistor 348 and a line 349 to the ground line 342. The input level of amplifier 346 is set by connection through resistors 351 and 352 to the slider of the variable resistor VR. The DC output level of the amplifier 346 is set by connection through a resistor 353 and aforementioned resistor 348 to the ground line 342. The detector output line 356 (from detector 305 of FIG. 3) connects through a resistor 357 to the input of the amplifier 346 and through a resistance 358 and meter M to ground line 342. A feedback network connects the amplifier output and input and comprises a first series pair of Zener diodes 360 paralleled by a second pair of reversely oriented Zener diodes 362. Resistor 363 connects a point intermediate the Zener diode 360 and another point intermediate the Zener pair 362 to ground line 342.

The output of the amplifier 346 is applied through a resistor 364 to regulating transistors TR1 and TR2, and more particularly to the base of transistor TR1. Transistors TR1 and TR2 have grounded emitters and collectors connected through resistors 365 and 366 to the positive supply line 340. Base bias for transistor TR2 is taken through a resistor 367 from the negative supply line 341. The base of transistor TR2 is driven from the collector of transistor TR1 through a resistor 368. Peak sensor output is taken from the collector of transistor TR2 on line 369 and applied to programming timer 312 and control circuit 313.

The detector output signal on line 356 includes a series of peaks and normally some noise, the level of the noise signals normally being lower than that of the peaks. The detector signal is applied to the input of amplifier 346. A selected portion of the positive supply voltage from line 340 is applied by variable resistor VR to the amplifier input. By proper adjustment of variable resistor VR the operating point of the amplifier 346 can be set so that only the detector peak signal, and not the aforementioned noise, appears at the amplifier output. Transistors TR1 and TR2 regulate the resultant output of the amplifier and apply a clean series of peaks to line 369.

The level slicer-type peak sensor 311 shown in FIG. 4 is preferred for use in processing gas chromatographic apparatus, as compared with a differential-type peak sensor, where the process gas chromatographic apparatus is located in an unfavorable location subject to noise pickup, that is, where the detector output may be contaminated with noise signals which are difficult to remove or identify utilizing a differential-type peak sensor. On the other hand, use of the differential-type peak sensor is contemplated or may be necessary to selectively sense double peaks relating to two or more components whose retention times are close to each other.

However, where the retention times of successive component peaks are extremely close, occurrence of double peaks may be previously avoided by use of a partition or separation column, such as column 304 of FIG. 3.

In the preferred embodiment shown, the programming timer 312 comprises a magnetic tape deck having a magnetic medium such as a magnetic tape T which is moved, through a suitable mechanical drive 371 by a motor MT, past the erase, record and playback heads E, R and P, respectively. The tape T can take any convenient form, such as a tape loop. Oscillators OSC-1 and OSC-2, which may be synchronized, provide drive for the erase and record heads E and R, respectively. Such oscillators are supplied operating potential by connection from the ground line 342 to a suitable positive DC supply line 373. A normally open relay contact RY3-1 is interposed between oscillator OSC-1 and the supply line 373. A further normally open relay contact RY2-1 connects in series with the contact RY3-1 between line 373 and the oscillator OSC-2. Contact RY2-1 closes upon energization of a relay RY2 connected to peak sensor output line 369. Contact RY3-1 is closed upon energization of a relay RY3 connected to the output of the direction circuit 308 of FIG. 3. A further relay RY4 is provided in the programming timer 312 and has a normally open contact RY4-1 connected in an AC supply line to the motor MT for controlling movement of the tape T. A playback amplifier 375 is supplied operating potential from lines 342 and 373. The playback amplifier amplifies signals from the playback head P and applies same through a full-wave rectifier 376 to energize a relay RY1.

Thus, in the particular embodiment shown, a magnetic tape recorder-player is employed as the programming timer. The programming timer has two principal functions, first, programming by recording the retention time of peaks on the magnetic tape T and, second, actuating the control circuit 313 by the output from playback amplifier 375 by means of relay RY1, which controls a contact in the control circuit 313 as hereinafter discussed.

Programming of the programming timer is conducted by feeding a standard sample to the gas chromatograph as above-discussed with respect to FIG. 3. Programming timer 307 (FIG. 3) energizes relay RY4 (FIG. 4) to turn on tape drive motor MT when a standard sample is to be fed. Direction circuit 308 controls standard sample feeding and actuates relay RY3, providing DC potential through contact RY3-1 to oscillator OSC-1 to energize erase head E to erase signals from prior runs. Relay RY3 is energized only when a standard sample is fed to the gas chromatographic analyzer, not when a stream sample is fed thereto for analysis.

Feeding of the standard sample through line 315 (FIG. 3) also results, as above-discussed, in a detector output and subsequent sensor output on line 369 (FIG. 4), the latter energizing relay RY2 at the time of and for the duration of the peak corresponding to the component of the standard sample whose concentration is to be determined. In consequence, contact RY2-1 is closed for the corresponding time period, energizing oscillator OSC-2 and thereby storing a signal on the tape T at the corresponding time position. The portion of the tape carrying the thus recorded signal then moves past the playback head P providing a signal of corresponding time duration through amplifier 375 to relay RY1 resulting in actuation of a corresponding contact of the control circuit 313, as hereinafter discussed. Such causes the control circuit 313 to apply a pulse signal to the integrator recorder 314 causing the latter to print out the calculated results of the analyzer output relating to the standard sample passing through an unadjusted sensitivity variable means, e.g., attenuator, in the attenuator unit 306 so as to provide unnormalized values of the components contained in the standard sample and enabling the sensitivity variable means 306 to be adjusted, in the manner above-described, by comparison of the recorded values in the indicator recorder with the known concentration of each component in the standard sample. Also as hereinafter discussed, a pulse signal is applied by the control circuit 313 to the attenuator selector to cause switching of the attenuators 306 in proper order.

After the initial setup and calibration of the apparatus in the manner above-discussed, a stream sample is applied to the apparatus through one of the stream selection valves 301. The stream sample may contain a component or components which are the same as components contained in the standard sample previously fed to the apparatus. Since, when a stream sample is fed, relay RY3 is not actuated, contact RY3-1 remains open and the erase and record heads are inoperative. However, relay RY4 is energized by the programming timer 307 and applies power to the motor MT causing the previously recorded magnetic tape T to move past the playback head P for energizing relay RY1.

Considering the control circuit 313 in detail, same comprises a relay RY5 connected from the peak sensor output line 369 to ground line 342. A further relay RY6 is connected from ground line 342 through a contact RY1-1 of relay RY1 of programming timer 312 to a positive potential line 379. Normally open contacts RY5-1 and RY6-1 closable by energization of relays RY5 and RY6, respectively, connect in series across contact RY1-1. Capacitors 381 and 382 connect to the ground line 342. The double throw contact RY6-2 of relay RY6 normally connects the capacitor 381 through isolating diodes 383 and 384 and corresponding lines 386 and 387 to the attenuator selector 316 and integrator recorder 314, respectively. Alternatively and upon actuation of relay RY6, the double throw contact RY6-2 connects capacitor 381 through a resistor 389 to positive potential line 379 for charging.

A double throw contact RY6-3 of relay RY6 normally connects capacitor 382 to a junction point 391 alternately, upon actuation of relay RY6, shunts the capacitor 382 for discharging same. Junction point 391 is normally connected by a double throw contact RY5-2 of relay RY5 through a diode 393 and line 394 to the reset line of the integrator recorder 314. Alternatively, upon energization of relay RY5, the double throw contact RY5-2 connects the junction point 391 through a resistor 395 to the positive potential line 379 for charging capacitor 382 when the contact RY6-3 is in the normal position shown.

Thus, control circuit 313 is actuated by outputs of the peak sensor 311 and programming timer 312, namely by energization of relay RY5 from line 369 and closure of contacts RY1-1 upon energization of relay RY1. More particularly, when the peak sensor output line 369 is energized, while either a standard sample or a stream sample is fed to the analyzer circuitry, relay RY5 will be energized. Relay RY6 on the other hand is energized when relay RY1 of the programming timer closes contact RY1-1, that is, whenever a signal is sensed by the playback head P. The control circuit 313 in turn controls the functions of the integrator recorder 314 and attenuator selector 316.

The operation of the control circuit 313 can conveniently be discussed in connection with various combinations of signals supplied thereto from the peak sensor and programming timer and indicated in FIG. 7.

Figure 7:
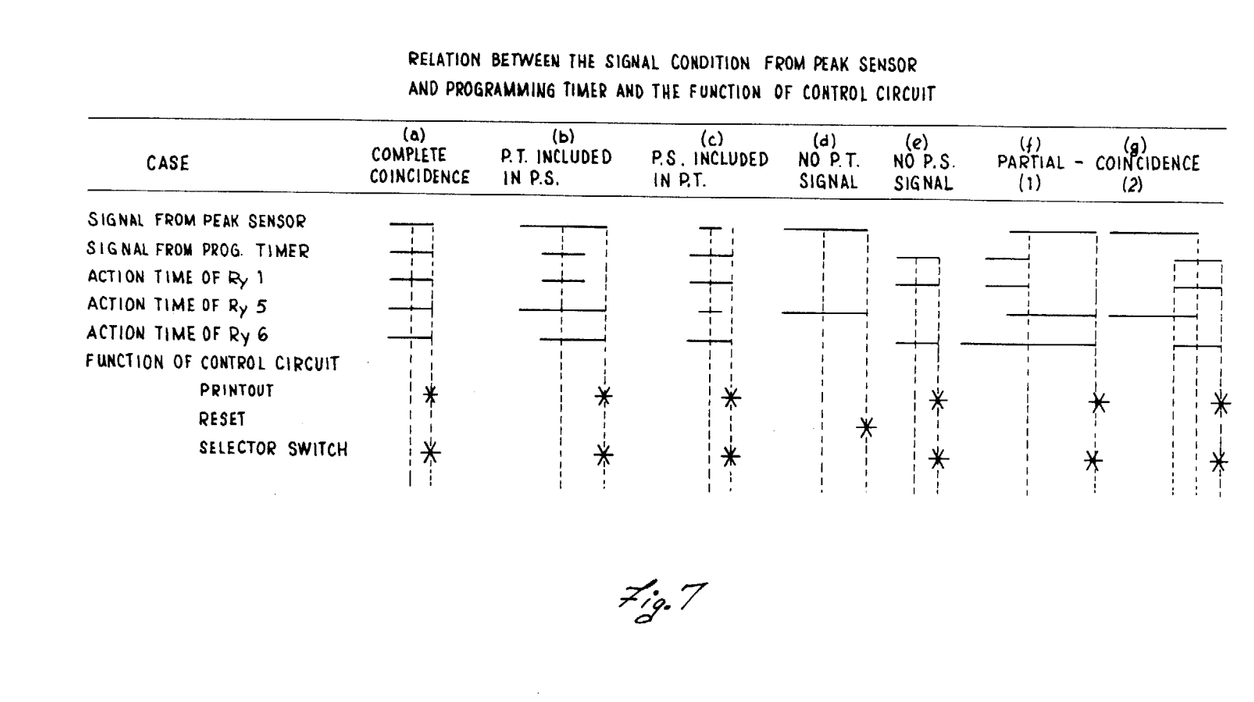
FIG. 7 is a function diagram illustrating the operation of the apparatus of FIGS. 3–6.

FIG. 7 illustrates the relation between the time positions of the output signal PS of the peak sensor 311 and the output signal PT of the programming timer 312 as well as the actuation times of relays RY1, RY5 and RY6 energized as a result of said signals. The functions of the control circuit 313, that is, printout or reset of the calculated results in the integrator recorder 314 and switching of the attenuator selector are also shown.

In FIG. 7, the horizontal bars represent the time length and placement of the output signals PS and PT and the actuation times of the individual ones of the several relays. The star marks represent the pulse signals to be supplied to the integrator recorder and attenuator selector.

Several relationships between the output signal PS of the peak sensor 311 and the output signal PT of the programming timer 312 are considered below.

Case A: PS signal completely coincides with PT signal.

In this case, relays RY1, RY5 and RY6 are actuated for the same duration, that is, while the PS and PT signals are supplied, and thereby the DC source line 379 (FIG. 4) charges capacitor 381 through resistor 389 and the leftwardly shifted contact RY6-2. Next, when the PS and PT signals have disappeared, the contact RY6-2 returns automatically to its rightwardmost or normal position NC whereby the charge accumulated in capacitor 381 is discharged therethrough and through line 387 to the integrator recorder causing the integrator recorder to print out the calculated result for the component causing the signal from the peak sensor and also through line 386 to the attenuator selector to cause the attenuator selector to shift to next attenuator of the group 306 in FIG. 3.

In view of the actuation of relay RY6, the contact RY6-3 thereof is shifted leftwardly, the capacitor 382 is discharged, and as a result no signal is passed through line 394 to the integrator recorder reset terminal.

Case B: PS signal is longer than PT signal.

In this case, relay RY5 is first actuated by the peak sensor output on line 369 and thereafter, the programming timer signal actuates relay RY1, closing contact RY1-1 thereof and energizing relay RY6. As a result of the corresponding actuation of contacts RY6-2 and RY6-3, capacitors 381 and 382 are respectively charged and discharged. Although here the PT signal terminates before the end of the PS signal, thereby turning off relay RY1 and opening contact RY1-1 thereof, the holding contacts RY5-1 and RY6-1 hold the relay RY6 actuated and the state of capacitors 381 and 382 continues unchanged. Then as in Case A above, the PS signal ends, deenergizing relay RY5 and through the opening of contact RY5-1, relay RY6, which applies the charge of capacitor 381 through lines 386 and 387 to the attenuator selector and integrator recorder printout as in Case A.

Case C: PT signal is longer than PS signal.

The result here is basically the same as in Case A above.

Case D: PS signal but no PT signal.

Here, the PS signal may be noise or a result of a component not to be analyzed. In the absence of a PT signal, relay RY1 and hence relay RY6 are not actuated. Thus, capacitor 381 is not charged. On the other hand, capacitor 382 is charged through the at rest, or rightwardly situated, contact RY6-3 and through the actuated, or leftwardly situated, contact RY5-2, the latter resulting from actuation of relay RY5 by the PS signal on line 369. When the PS signal terminates, contact RY5-2 returns rightwardly to its rest, or NC, position shown in FIG. 4 for transferring the charge on capacitor 382 through line 394 to the reset terminal of the integrator recorder to cause the integrator recorder to reset.

Case E: PT signal but no PS signal.

This indicates that the concentration of the relevant component may be zero or near zero. The action in this case is essentially the same as in Case A above.

Cases F and G:

The PS signal is delayed with respect to the PT signal in Case F and is advanced with respect to the PT signal in Case G.

These cases are rather abnormal conditions, however, as in Case A, the calculated results are picked up in the integrator recorder and the attenuator selector is shifted.

Figure 5:
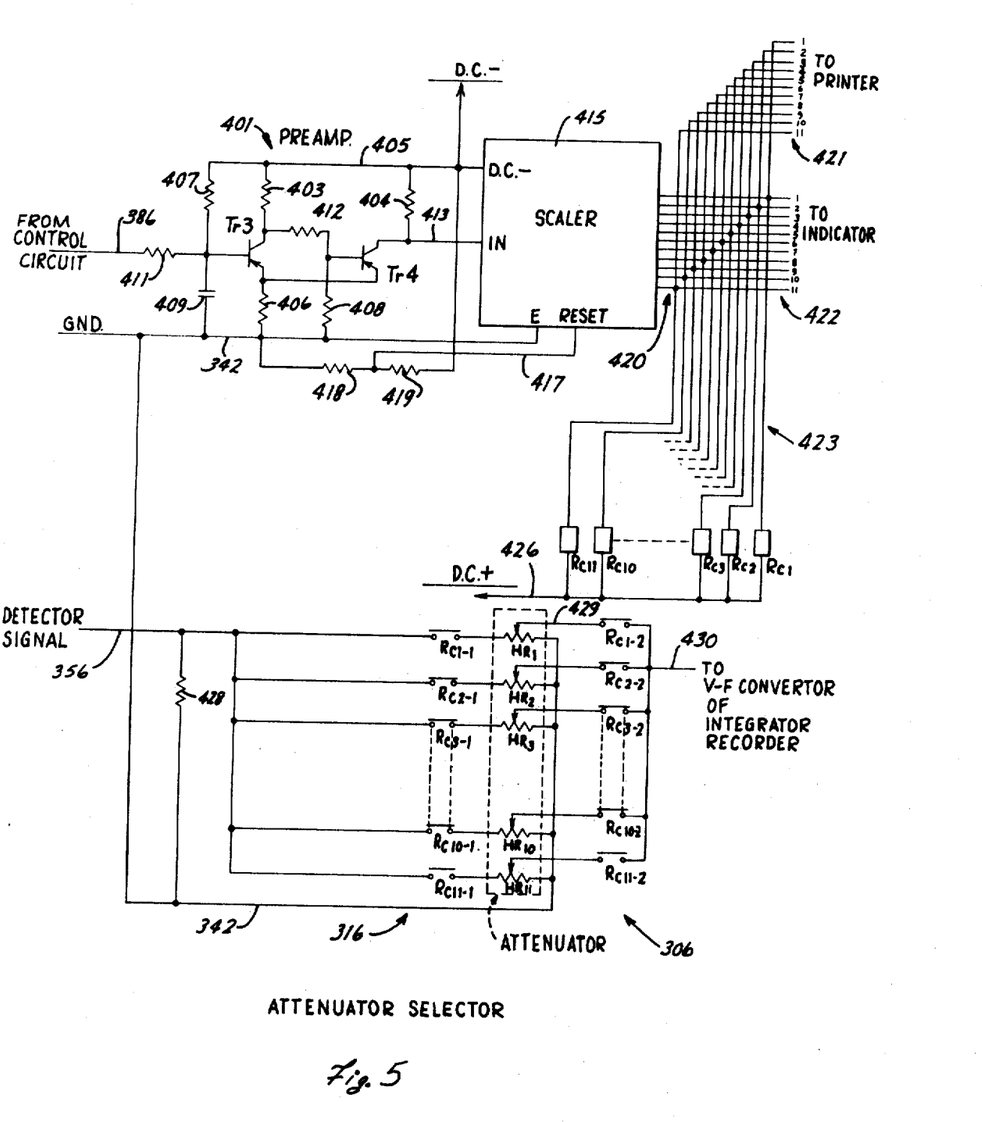
FIG. 5 is a circuit diagram of the selector circuit of FIG. 3.

FIG. 5 discloses details of a preferred form of the attenuator selector 316 and its connection to the attenuator set 306. The selector 316 includes a preamplifier 401 incorporating transistors TR3 and TR4. The collectors of transistors TR3 and TR4 connect through resistors 403 and 404 here to a negative potential line 405 while their emitters connect through a common resistor 406 to ground line 342. Bias is applied to the bases of transistors TR3 and TR4, respectively, through a resistor 407 connected to negative potential line 405 and a resistor 408 connected to ground line 342. A capacitor 409 connects the base of transistor TR3 to the ground line. An input signal from the control circuit 313 supplied through line 386 and a resistor 411 to the base of transistor TR3 for applying, through a resistor 412 connected to the collector of transistor TR3, a signal to the base of transistor TR4 to render same conductive placing a signal on the collector line 413 thereof.

Output is taken from the preamplifier 401 through line 413 and applied to a scaler 415 which receives operating potential from the lines 405 and 342 and is provided with a reset line 417 intermediate the ends of a resistive voltage divider 418 and 419 connected across the supply lines 342 and 405. The scaler has a plurality 420 of output lines here individually numbered 1 through 11. Each of the output lines 420 is branched in several directions. Thus, one set of output lines 421 connects to the printer of the indicator recorder 314 to cause same to step in sequence with the sequence of signals from the control circuit, that is, in sequence with the series of detector outputs relating to several components to be measured. A similar branch set of output lines 422 goes to a suitable indicator portion of the integrator recorder, if such an indicator is provided.

A still further branch set 423 of such lines goes to a set of relays numbered RC1 through RC11, a corresponding line going to each relay, the other side of each said relay being connected to a common positive DC potential line 426. Thus, the relays RC1 through RC11 are activated in sequence, such sequence being the sequence of activation of the several output lines 420 of the scaler.

The detector output line 356 connects through a resistor 428 to ground line 342 as well as to a plurality of normally open contacts RC1-1 . . . RC11-1, arranged in parallel and being closable upon actuation of the corresponding relays RC1 . . . RC11. The contacts RC1-1 . . . RC11-1 in turn connect to corresponding ones of the attenuators HR1 . . . HR11 of attenuator unit 306, each of said attenuators being in turn connected to ground line 342. The attenuators HR1 . . . HR11 are equipped with sliders, one of which is indicated at 429. The attenuator unit 306 further includes a plurality of normally open contacts RC1-2 . . . RC11-2 closable upon actuation of corresponding relays RC1 . . . RC11, of the contacts RC1-2, etc., connecting between the slider of the corresponding one of the attenuators HR1 etc. and a common output line 430 to the integrator recorder 314.

Thus, a pulse signal generated by the control circuit 313 is provided to the preamplifier 401 which amplifies said signal to a level sufficient to actuate the scaler 415. The scaler 415 sequentially actuates output lines 1–11 of each group 421, 422 and 423 as signals are applied thereto from preamplifier 401. Thus, the relays RC1 . . . RC11 are energized one at a time in the same sequence, one relay being actuated for each signal from the control circuit. Actuation of each of the relays RC1, etc., closes the corresponding contacts RC1-1 and RC1-2, etc., thereof, thereby passing the detector signal then on the line 356 through the corresponding one of the attenuators HR1, etc., and its slider to the output line 430 and then to the integrator recorder 314 for further processing.

Figure 6:
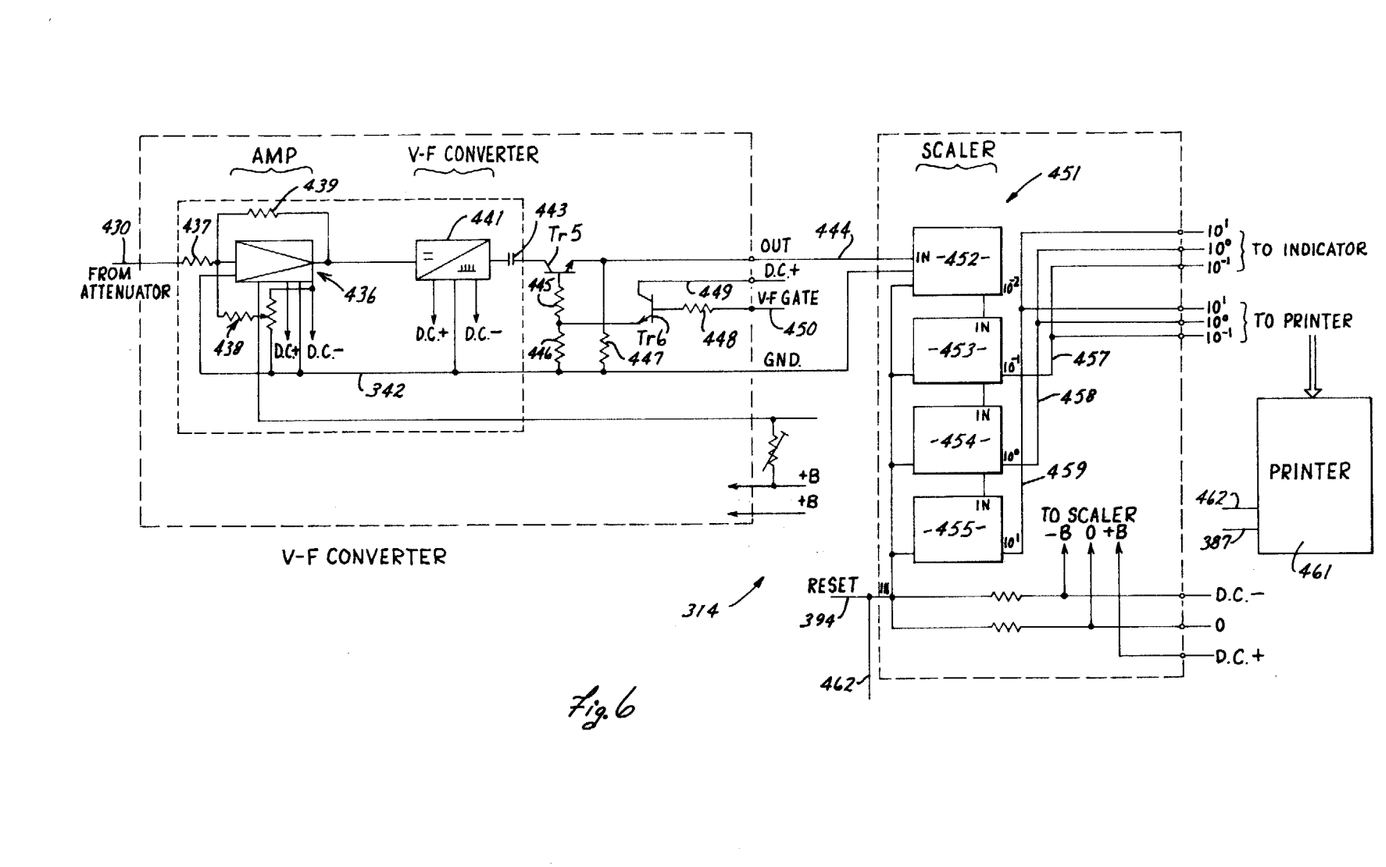
FIG. 6 is a circuit diagram of the integrator recorder block of FIG. 3.

FIG. 6 discloses the integrator recorder 314 in a preferred form. The integrator recorder 314 includes an amplifier 436 receiving an input signal from the attenuator output line 430 through a resistor 437. Operating potential is supplied to the amplifier 436 by any convenient means through suitable connections to positive and negative DC supplies and by connection through a suitable resistance network 438 to the ground line 342. The amplifier 436 includes a feedback resistor 439. The amplifier 436 provides a voltage output, corresponding to the signal on line 430, to a voltage to frequency converter 441 which is supplied operating potential by any convenient means here involving connections to positive and negative DC supplies and to ground line 342. Although voltage to frequency converters as such are known, and it is contemplated that the voltage to frequency converter 441 may take many of several forms, the converter 441 preferably includes a flip-flop circuit (not shown) and means for varying the switching rate of the flip-flop so as to increase same with an increase in the voltage on attenuator output line 430, thereby to provide a train of pulses the frequency of which varies with the amplitude of the attenuator output signal.

The pulse train from the voltage to frequency converter 441 is applied through a capacitor 443 to a gate circuit comprising transistors TR5 and TR6. The transistor TR5 gates the voltage to frequency converter output through its collector and emitter terminals to an output line 444. The base of transistor TR5 connects through a series resistive network 445, 446 to ground line 342 and the emitter thereof connects through a further resistor 447 to the ground line also. Conduction of transistor TR5 is controlled by transistor TR6 the base of which is connected through a resistor 448 to a gate signal input line 350.

The gate signal applied to the base of transistor TR6 may be from any convenient source energized for substantially the time of the peak signal from the detector 305, for example the input line 369 to the control circuit 313. The collector and emitter of transistor TR6 connect from a positive DC potential line 449 to a point intermediate the ends of resistive network 445, 446.

The integrator recorder 314 further includes a scaler unit 451, here a decimal scaler, which operates as a decimal output counter for counting pulses gated thereto from the voltage to frequency converter. The scaler 451 comprises a plurality, here four, of serially connected decimal output scaler blocks. Gate output line 444 is connected to the input of the first scaler block 452, the output of which drives the input of the scaler block 453 for the next decade, and so on throughout the series of decimal scaler blocks 452 through 455. In addition, outputs are taken from the scaler blocks, here from blocks 453 through 455, and applied through lines 457 through 459, respectively, to a suitable indicator, if one be provided, and to a printout device 461. Each of the scaler blocks 452 through 455 is connected to reset line 394 from the control circuit 313 and to reset line 462 of printer 461 for clearing the scaler 451. Operating potential may be applied to the blocks of the scaler 451 by any conventional means.

In operation then, an output on attenuator line 430 (a DC voltage corresponding to the normalized value of a sample peak from one of the attenuators HR1 . . . HR11) is applied by amplifier 439 to the voltage to frequency converter 441. The output of the voltage to frequency converter 441, a train of pulses having a frequency proportional to the value of the DC voltage from amplifier 436, is gated by transistor TR5 through the output line 444 to the scaler 451 to correspondingly increase the count appearing on the output lines 457, 458 and 459 thereof. The output of the scaler is thus the integrated value in digital, here decimal form of the signal from the detector 305 and is applied to an indicator if desired and/or to printer (recorder) 461. The choice of pickup by the printer or reset is attained by means of signals from the control circuit 313 via lines 387 and 394. Reset of scaler 451 after finishing printout is carried out by reset signal from reset line 462 of printer 461.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A process gas chromatographic apparatus including a detector providing a signal with peaks corresponding to components of a gas sample, comprising in combination:

sensitivity-variable selector means responsive to said detector signal and including at least one adjustable sensitivity-variable means for passing and weighting a corresponding detector signal peak and related to an individual component to be determined so that the concentration of said component is given as a proportion to the total amount of the whole of the components in a sample to be analyzed;

peak sensor means responsive to said detector signal for sensing and signaling the occurrence of said peaks;

programming timer means programmable by said peak sensor means when a standard sample having known components is applied to the apparatus for memorizing the time relation of the sensed peaks corresponding to one set of said standard sample components and for generating correspondingly time-related signals when a sample having unknown component proportions is subsequently applied to said apparatus;

a control circuit means for controlling the selection of said sensitivity-variable means in response to preselected time relations between signals from said peak sensor means and said programming timer means; and integrator-recorder means responsive to the signal peak from said sensitivity-variable selector means for producing the integrated value of said signal in a digital form representative of the percentage of the desired component relative to the whole of the components in the sample analyzed.

2. A process gas chromatographic apparatus according to claim 1, wherein said programming timer means comprises a magnetic memory timer.

3. A process gas chromatographic apparatus according to claim 1, wherein the programming of said programming timer means is conducted by the signal from said peak sensor means.

4. The apparatus of claim 1 in which said control circuit means is connected to said peak sensor means and includes means responsive to said programming timer means and coupled to said integrator-recorder means for preventing recordation in the absence of said correspondingly time-related signal from said integrator-recorder means and despite presence of a signal from said peak sensor means, whereby noise pulses interspersed among desired component peaks are ignored by said integrator-recorder means.

5. The apparatus of claim 1 in which said sensitivity-variable means comprises a plurality of signal amplitude varying means insertable in the path of the detector signal to compensate for differing apparatus sensitivities to corresponding sample components and including selector means interposed between said sensitivity-variable means and said detector and actuable by connection to said control circuit means for switching successive detector signal peaks to successive and corresponding ones of said amplitude varying means in timed relation to successive and corresponding ones of control signals from said control circuit means, said control circuit means including means blocking switching of said selector means in the absence of a time related signal from said programming timer means and despite presence of a signal from said peak sensor means.

6. The apparatus of claim 1 in which said integrator-recorder means includes a voltage to frequency converter responsive to signal amplitudes from said sensitivity-variable means and a digital scaler for counting pulses produced by said voltage to frequency converter whereby the output of said scaler is the integrated value in digital form of a weighted and selected one of the detector signal peaks.

7. A process gas chromatographic apparatus having means for obtaining a gas sample from a stream and a detector providing a signal including a series of peaks respectively related to a series of components in the sample, the combination comprising:

peak sensor means responsive to said detector signal for sensing and signaling the occurrence of said peaks;

programming timer means programmable by said peak sensor means when a standard sample having known components is applied to the apparatus for memorizing the time relationship of the sensed peaks corresponding to one set of said standard sample components and for generating correspondingly time related signals when a sample having unknown component proportions is subsequently applied to said apparatus;

control circuit means responsive to signals from said programming timer means for producing a first control signal and responsive to presence of a peak sensor means signal when a programming timer means signal is absent for providing a second control signal;

sensitivity-variable means comprising a plurality of signal amplitude varying means presetable to compensate for differing apparatus sensitivities to corresponding sample components in response to variations imposed thereby on corresponding detector signal peaks for components of known percentage amounts in a standard sample, each varying means corresponding to a different component;

selector means connected between the input side of said sensitivity-variable means and the output of said detector and actuable by connection to said control circuit means for switching successive detector signal peaks to successive and corresponding ones of said amplitude varying means in timed relation to successive and corresponding ones of the first control signals;

integrator-recorder means connected to the output side of the said plurality of amplitude varying means for receiving weighted detector signal peaks therefrom, said integrator-recorder means including means for producing integrated digital representations of ones of said weighted detector signal peaks and means for recording said digital representations, said recorded representations being digitally proportional to the percentage amount of desired ones of said components in said sample;

means applying said second control signal to said integrator-recorder means for preventing recordation thereby in the absence of a programming timer means signal and despite the presence of a detector signal peak;

whereby noise pulses interspersed among the component peaks in the detector signal are ignored by said integrator-recorder means.

8. Apparatus according to claim 7 wherein the peak sensor means comprises level slicer type means for sensing detecter outputs having an electrical value higher than a certain level.

9. The apparatus of claim 7 in which said peak sensor means comprises differential means for sensing the start and end of a detector signal peak.

10. The apparatus of claim 7 in which said programming timer means comprises a moveable magnetic medium for sequentially recording detector peak signals from said standard sample.

11. The apparatus of claim 7 in which said means for producing integrated digital representations comprises a voltage-frequency converter for converting a D.C. voltage whose amplitude varies in time into a frequency signal having a frequency proportional to the voltage amplitude value of the D.C. voltage and further includes means for counting the oscillations of the frequency signals over the time duration of the D.C. voltage peak for producing a plurality of counts which in number correspond to the integrated value of the voltage peak.

* * * * *